US012269302B2

(12) United States Patent
Corghi

(10) Patent No.: US 12,269,302 B2
(45) Date of Patent: Apr. 8, 2025

(54) TYRE INFLATING DEVICE AND METHOD FOR CONTROLLING A TYRE INFLATING PROCESS

(71) Applicant: NEXION S.P.A., Correggio (IT)

(72) Inventor: Giulio Corghi, Correggio (IT)

(73) Assignee: NEXION S.P.A., Correggio (IT)

( * ) Notice: Subject to any disclaimer, the term of this patent is extended or adjusted under 35 U.S.C. 154(b) by 65 days.

(21) Appl. No.: 17/653,586

(22) Filed: Mar. 4, 2022

(65) Prior Publication Data
US 2022/0288978 A1 Sep. 15, 2022

(30) Foreign Application Priority Data
Mar. 12, 2021 (IT) .......................... 102021000005957

(51) Int. Cl.
*B60C 23/00* (2006.01)
*G05D 16/10* (2006.01)

(52) U.S. Cl.
CPC .. *B60C 23/00372* (2020.05); *B60C 23/00354* (2020.05); *G05D 16/101* (2019.01)

(58) Field of Classification Search
CPC .............. B60C 23/10; B60C 23/00354; B60C 23/00372; G05D 16/101; B60S 5/043; Y10T 137/36
See application file for complete search history.

(56) References Cited

U.S. PATENT DOCUMENTS

| 3,283,775 A | * | 11/1966 | Spender .................. B60S 5/046 |
| | | | 137/224.5 |
| 4,862,912 A | * | 9/1989 | Stoll ....................... G05D 16/16 |
| | | | 137/484.2 |
| 5,293,910 A | * | 3/1994 | Mohs ...................... B60S 5/043 |
| | | | 157/1.1 |
| 2014/0034202 A1 | | 2/2014 | Voith et al. |
| 2014/0182704 A1 | * | 7/2014 | Gonzaga ........... B60C 23/00354 |
| | | | 137/224 |

FOREIGN PATENT DOCUMENTS

| CN | 207421416 U | * | 5/2018 |
| DE | 102011017118 A1 | | 10/2012 |
| EP | 2746068 B1 | | 4/2020 |
| IT | 202016000083023 | | 12/2018 |

* cited by examiner

Primary Examiner — Matthew W Jellett
(74) *Attorney, Agent, or Firm* — Chrisman Gallo Tochtrop LLC

(57) ABSTRACT

A tyre inflating device (100) comprises an air feed line (200) and an inflating module (300), which includes: a primary valve (301) movable between a closed position and an open position for closing and opening the feed line (200); a first cylinder (302a) connected to the primary valve (301) and supplied with air by a first branch (201a) of the feed line (200); a second cylinder (302b) connected to the primary valve (301); a shutoff valve (303) located on the first branch (201A); a control leg (202) from which there extends a relief duct (201a'), which is configured to gradually release air from the first cylinder (302a) to the outside environment and includes at least one between (i) a plurality of throttles (304) located in series and (ii) a shutter placed in a constriction element (305) located in the relief duct (201a').

20 Claims, 6 Drawing Sheets

TYRE INFLATING DEVICE AND METHOD FOR CONTROLLING A TYRE INFLATING PROCESS

Figure 1A:
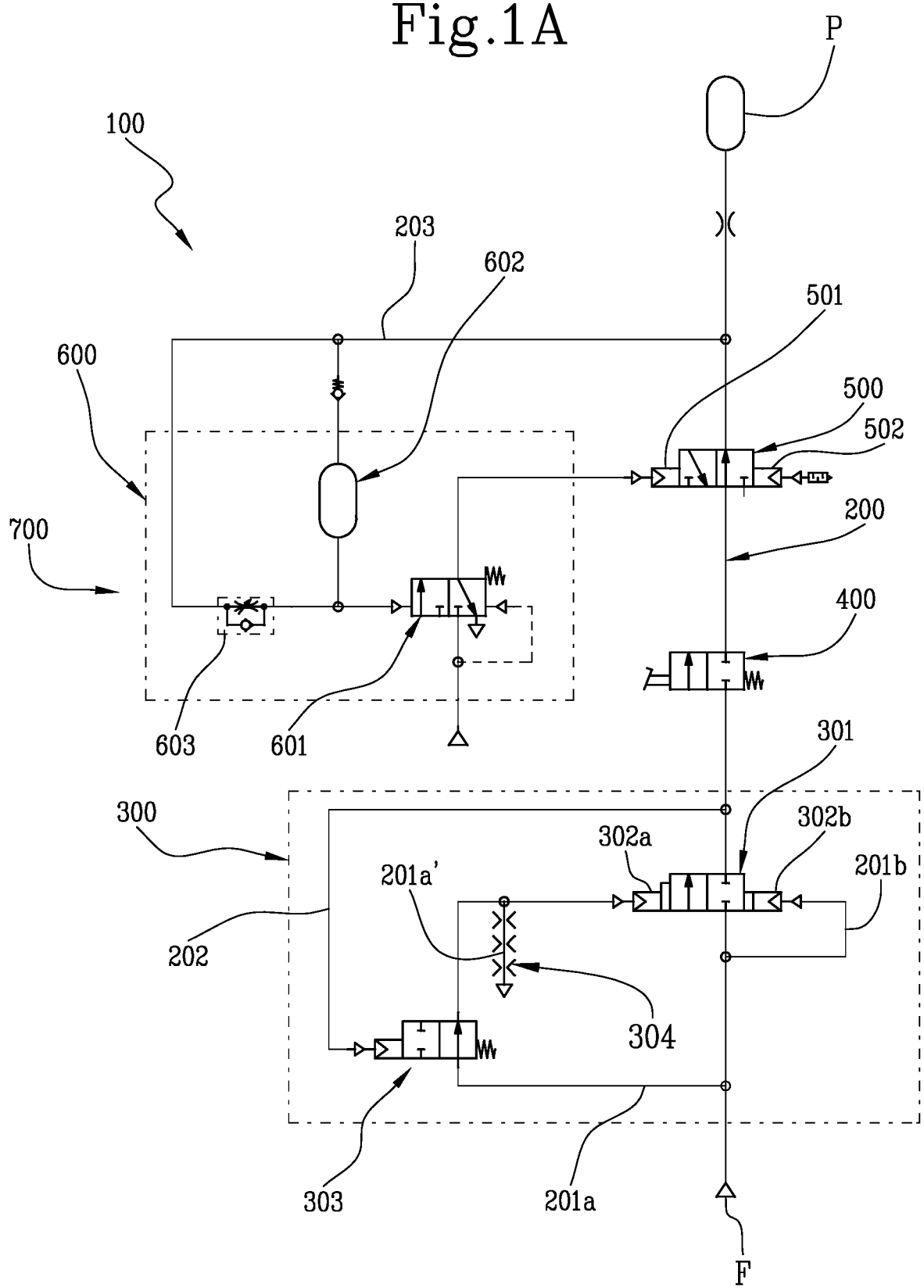

This invention relates to a tyre inflating device and to a method for controlling a tyre inflating process.

At the present time, prior art devices used to inflate tyres are provided with an air feed line configured to feed air under pressure from a pressurized air source to the tyre. An example of such a device is described in document IT202016000083023. This device allows tyres to be inflated while checking that the pressure does not exceed a predetermined safety threshold.

A need which is felt by the trade and which prior art inflating devices meet only by providing highly onerous mechanical modifications is that of reducing inflation time under equal conditions of safety pressure.

Another example of such a device is disclosed in document EP2746068B1, which describes an inflating apparatus comprising a primary valve movable between an open position, in which it allows air to pass between the feed line and the tyre, and a closed position, in which air is prevented from passing. More specifically, the ends of the valve are mounted in two cylinders which differ in cross section (and volume) and which are fed by respective branches of the feed line. The cylinders are mounted in such a way that filling fluid into the cylinder with the larger cross section causes the primary valve to be pushed towards the open position, whereas when only the cylinder with the smaller cross section is filled, the primary valve is pushed towards the closed position.

In the device disclosed in document EP2746068B1, as in other prior art devices, the branch that feeds fluid to the cylinder with the larger volume is provided with a shutoff valve which is movable between a closed position and an open position and which is calibrated to suitably control the position of the primary valve, hence the supply of fluid to the tyre.

During an inflating cycle, therefore, air is made to flow along the feed line through the primary valve to reach the tyre. The air pressure in the tyre is then measured and checked in such a way that if it is greater than a predetermined threshold value, the shutoff valve is closed and the primary valve is switched from the open position to the closed position in order to interrupt air feed to the tyre.

In this situation, the prior art also teaches that the tyre inflation time can be controlled, and in particular, reduced, by mounting a tank along the feed branch to the cylinder with the larger cross section. As shown for example in EP2746068B1, the tank is placed along the branch of the feed line connected to the cylinder with the larger cross section so that when the shutoff valve is closed, the primary valve is kept at the open position for as long as possible to facilitate the passage of air to the tyre.

Disadvantageously, the addition of the tank to the inflating device makes the inflating device expensive and cumbersome.

Usually, the tanks are made using specific moulds constructed according to the required size of the tank. Customizing the moulds makes tank production a long and drawn-out process which raises the cost of the tank. Moreover, the means required to connect the tanks to the inflating device are usually non-standard and must be especially made. This aspect, too, contributes to increasing the complexity and cost of the tank and, as a result, of the inflating device as a whole. Another drawback of this prior art solution is that it is poorly adaptable to different inflating requirements—for example, to varying the maximum inflating pressure allowed by the device. The addition of the tank is also onerous in terms of space occupied by the device in that the tank has a considerable size and weight. This aspect, too, contributes to increasing the complexity of mounting the tank in the inflating device.

Thus, a need which is felt by the trade and which prior art inflating devices meet only by providing highly onerous mechanical modifications is that of reducing inflation time under equal safe pressure conditions.

Another tyre inflation device is described in document CN207421416U. Document CN207421416U illustrates a tyre inflation device, in which there are a first and a second branch, connected to a first and a second cylinder, respectively. The first and second cylinders determine the opening and closing of a main valve which inhibits the passage of air to the tire. CN207421416U also illustrates an interception valve, arranged on the first branch, to inhibit the flow of air into the first cylinder and therefore allow the main valve to close under certain pressure conditions. This shutoff valve is operated by means of a respective actuation branch, which has a pressure point downstream of the main valve in the direction of inflation of the air.

Document CN207421416U discloses a calibration hole that allows an air vent to the outside from the first cylinder. However, CN207421416U simply describes a hole through which air can pass for exhaust. This solution is not very adjustable and therefore not very flexible.

Another tyre inflation device is described in document DE102011017118A1. Document DE102011017118A1 illustrates an inflation device wherein the venting duct are connected to the supply line of the first cylinder and to a section upstream of the main valve. Furthermore, the venting duct of DE102011017118A1 has a non-return butterfly valve which has the sole function of allowing the flow of air in one direction only, that of the vent. Thus, also this solution is not very adjustable and therefore not very flexible.

This disclosure therefore has for an aim to provide a tyre inflating device and a method for controlling a tyre inflating process to overcome the above mentioned disadvantages of the prior art.

More specifically, the aim of this disclosure is to provide a tyre inflating device which is versatile in terms of varying the tyre pressure threshold and/or in terms of inflating time but which is, at the same time, simple in construction and inexpensive.

Another aim of this disclosure is to provide a tyre inflating device that is simple to construct and assemble and easy to maintain.

A further aim of this invention is to propose a reliable method for controlling a tyre inflating process.

The technical purpose and aims specified are achieved by a tyre inflating device and a method for controlling a tyre inflating process, comprising the technical features set out in one or more of the accompanying claims.

This disclosure regards a tyre inflating device. The inflating device may form part of wheel or vehicle service equipment (for example, tyre changers, balancing machines and even vehicle lifts). In an embodiment, the inflating device is for a tyre changing apparatus; in this context, this disclosure also regards a tyre changing apparatus comprising the inflating device.

The inflating device comprises an air feed line which allows air to flow from an air feed source to the tyre, and an inflating module which is operatively interposed between the feed source and the tyre.

The inflating device (or module) comprises a primary valve, located on the air feed line and movable between a closed position, where it prevents air from flowing into the tyre, and an open position, where it allows air to flow in.

The inflating device (or module) also comprises a first cylinder and a second cylinder, connected to the primary valve in opposition to each other, so that when the first cylinder prevails over the second, the primary valve is at the open position and, vice versa, when the second cylinder prevails over the first, the primary valve is at the closed position.

In this disclosure, it is understood that the direction of flow in the feed line is from the (pressurized air) feed source to the tyre; therefore, the expressions "upstream" and "downstream" used hereinafter refer to this direction of flow of the air in the feed line.

The first cylinder may be fed by a first branch which is connected by a shutoff valve to the air feed line at a point upstream of the primary valve. The first cylinder may be fed by a second branch, extending from the air feed line at a point upstream of the primary valve.

The inflating device (or module) is configured to interrupt air feed to the first cylinder when the pressure downstream of the primary valve (of the tyre) exceeds a predetermined pressure value.

In an example embodiment, the second cylinder is fed (with the air from the air feed source) all the time.

Preferably, the inflating device (or module) is configured to allow the first cylinder to prevail over the second when both the first and the second cylinder are being fed (connected to the air feed line). For example, the second cylinder has a working cross section that is smaller than the corresponding working cross section of the first cylinder.

In an example embodiment, the inflating device (or module) includes a shutoff valve, located on the first branch and movable between a closed position, where it occludes the first branch to prevent fluid communication between the feed line and the first cylinder, and an open position, where it allows fluid communication. The inflating device (or module) also includes a control leg which allows air (or fluid) to be fed to the shutoff valve from a point in the feed line downstream of the primary valve. The inflating device (or module) is configured in such a way that the feeding of air (or fluid) switches the shutoff valve from the open position to the closed position in response to the predetermined pressure value being exceeded.

The inflating device (or module) also includes a relief duct, extending from the first branch between the shutoff valve and the first cylinder and configured to gradually release air from the first cylinder to the outside environment when the shutoff valve is closed.

The inflating device (or module) also includes a constricting arrangement which reduces the working air flow cross section of the relief duct.

According to a (first) aspect of this disclosure, the (constricting arrangement of the) inflating device comprises a plurality of throttles located in series in the relief duct.

The term throttle means a narrowing (adjustable or fixed) of the relief duct which can be due to an occluding body or to a fixed reduction of the section of the relief duct. In one embodiment, the relief duct has a variable section along an air discharge direction.

In addition, or alternatively, according to a (second) aspect of this disclosure, the (constricting arrangement of the) inflating device comprises an occluding member (a shutter) located inside the relief duct to partially occlude it. In an example, the relief duct includes a constriction element (for example, a throttle), which defines a stretch of the relief duct with a reduced cross section (reduced compared to the rest of the relief duct). In this case, the occluding member is preferably positioned inside the constriction element to partially occlude the stretch of the relief duct with the reduced cross section.

The plurality of throttles located in series and/or the occluding member have the function of slowing the egress of air from the first cylinder (that is, the cylinder that is larger in volume) when the shutoff valve is at the closed position.

In one embodiment, the relief duct is open to the external environment, therefore in an area having atmospheric pressure. In other embodiments, the relief duct is open to a duct or tank having atmospheric pressure. This allows for greater safety as it avoids the risk that the relief duct may have a higher back pressure and that, therefore, the air is not properly discharged from the cylinder.

Preferably, the first branch has no air buffer tanks or vessels configured to expand the volume of air contained in the first branch and in the first cylinder.

In an embodiment, the occluding member is operatively inserted, and partly free to slide, in the constriction element. The constriction element is in turn inserted in the relief duct. That way, the occluding member defines a movable shutter that reduces the flow cross section of the constriction element.

The inflating device of the disclosure may comprise a regulator to vary the free flow cross section of the relief duct.

The term "regulator" is used to denote any device or means which allows varying in controlled manner the free flow cross section of the relief duct. The regulator may include other components, in addition to the throttles and the shutter, or it may be integrated in a component which (also) performs the function of throttle or shutter. For example, the regulator might include a fitting, used to derive from the relief duct a pipe for connection to a component that includes a movable shutter; in addition, or alternatively, the regulator might include the means for regulating one or more throttles, provided the one or more throttles are of a regulatable type. For example, the occluding member is a shutter which is movable to allow varying the working cross section through which the fluid in the relief duct flows. In addition, or alternatively, the throttles of the plurality of throttles are of the type that can be regulated (using the regulator).

According to a further aspect of this disclosure, the inflating device, in an embodiment of it, comprises an auxiliary safety module. The auxiliary safety module has the function of coming into operation if the inflating module is not activated correctly when the inflating pressure exceeds the safety threshold.

In an embodiment, the auxiliary safety module comprises a secondary valve, located on the air feed line downstream of the inflating module (downstream of the primary valve) and movable between a discharging position, where it allows air to flow out of the tyre into the outside environment, and a charging position, where it allows air to flow from the inflating module to the tyre in order to inflate the tyre.

The auxiliary safety module also comprises a first secondary cylinder and a second secondary cylinder, connected to the secondary valve in opposition to each other, so that when the first secondary cylinder prevails over the second, the secondary valve is at the open position and, vice versa, when the second secondary cylinder prevails over the first, the secondary valve is at the closed position.

Thus, according to another (second) aspect of this disclosure, the inflating device comprises a secondary valve, located on the air feed line downstream of the inflating module (downstream of the primary valve) and movable between a closed position, in which it prevents air from flowing in the feed line between the secondary valve and the tyre, and an open position, where the air is allowed to flow.

The (auxiliary safety module of the) inflating device comprises a safety line which is connected to the feed line at a point between the secondary valve and the tyre.

The (auxiliary safety module of the) inflating device may also comprise a timing module. The timing module may comprise a diverter, a flow limiter and a buffer tank.

The diverter is connected to the first secondary cylinder and is movable between a feed position, where it allows the first secondary cylinder to be connected to the feed source (to bring the first secondary cylinder to the feed pressure) and a rest position, where it allows the first cylinder to be connected to the outside environment (to bring the first secondary cylinder to ambient pressure).

In an example embodiment, the flow limiter is regulatable.

In an example embodiment, the safety line is connected to the flow limiter and to one end of the buffer tank. The flow limiter is connected to a switching input of the diverter.

When the pressure in the safety line is falling, the pressure inside the buffer tank quickly follows the pressure trend of the safety line (this occurs through a unidirectional valve placed in series with the buffer tank). When the pressure in the safety line is rising, the pressure inside the buffer tank follows the pressure of the safety line with a certain delay because the air passage is obstructed.

Under normal operating conditions, the auxiliary safety module does not come into operation: the secondary valve is at its charging position and the diverter is at the rest position, irrespective of the state of the valves of the inflating module. Under normal operating conditions, the pressure in the safety buffer tank never reaches a threshold value which would cause the diverter to switch from the rest position to the feed position.

In an operating condition which can be defined as anomalous (that is, not normal), the following might occur and would trigger the safety module into operation. The pressure in the safety line exceeds the threshold value long enough for the pressure in the buffer tank to rise above the value that causes the diverter to switch to the feed position; at this point, the auxiliary safety module comes into operation: the first secondary cylinder is fed at the feed pressure and, as a result, the secondary valve moves to its discharging position. In practice, when the safety module is activated, the tyre is connected to the outside environment so that the pressure in it can be relieved to reduce the danger.

To return to standard operating conditions after the safety module has come into operation, the safety module has to be reset.

In an embodiment, resetting the safety module to standard operating conditions is not automatic but must be carried out in response to specific actions of the operator. For example, to return the secondary valve to the feed position, the operator must feed the second secondary cylinder through a specific inlet (at a pressure higher than the ambient pressure). Until the second secondary cylinder is fed, the entire inflating device is prevented from functioning.

According to a further aspect of this disclosure, the inflating device comprises a distribution valve which is operable to allow or prevent air flow from the inflating module to the tyre; it includes, for example, a pedal or other control element. Preferably, the distribution valve is located on the feed line downstream of the inflating module; for example, the distribution valve is located on the feed line downstream of the inflating module and upstream of the secondary valve (in such a case, going from the pressurized air source to the tyre, we have the primary valve, the distribution valve and the secondary valve, in that order). Alternatively, the distribution valve might be located upstream of the inflating module (along the feed line).

This disclosure also provides a method for inflating a tyre, in particular (but not exclusively) in a tyre changing apparatus.

According to an aspect, this disclosure provides a method for controlling a tyre inflating process, in particular (but not exclusively) in a tyre changing apparatus.

Inflation is carried out by an inflating device, for example, according to one or more of the features described in this disclosure with regard to the inflating device.

The method comprises a step of (preparing for) connecting the feed line to the source of air (that is, the pressurized air source).

The method comprises a step of feeding air to the first cylinder, for example, through the first branch, and to the second cylinder, for example, through the second branch. That way, the primary valve is at the open position.

The method comprises a step of feeding air to the shutoff valve, for example, through the control leg.

The method comprises a step of measuring the pressure value of the air entering the tyre.

The method also comprises a step of comparing (with mechanical/pneumatic or electronic or other means) the measured pressure value with a predetermined pressure value.

The method also comprises a step of driving the shutoff valve between the open position and the closed position in response to this comparison. Thus, if the measured pressure value is greater than the predetermined pressure value, the shutoff valve is switched from the open position to the closed position.

The method comprises a step of continuing to feed air to the second cylinder to switch the primary valve from the open position to the closed position. That way, air feed to the tyre is interrupted.

The method comprises a step of discharging air from the first cylinder to an outside environment through an air passage in the relief duct; this condition occurs when the first cylinder is not being fed because the shutoff valve is closed.

According to an aspect of this disclosure, during the step of discharging, the working air flow cross section of the relief duct is reduced.

To provide such a reduction, at least one of the following conditions may be provided:
 (i) the air passes through a plurality of throttles placed in series along the relief duct,
 (ii) the air passes through a stretch of the relief duct that is partly occluded by an occluding member (a shutter); preferably, this stretch of the relief duct (where the occluding member is positioned) is a stretch with a narrow cross section, defined by a constriction element inserted in (or forming part of) the relief duct to define the stretch with the reduced cross section.

This allows increasing the time constant of the transient in which the air flows out of the first cylinder into the outside environment, thus reducing the pressure in the first cylinder. This makes inflation quicker because, during the transient, the primary valve continues to be open, so the tyre continues to be connected to the pressurized air source.

In an example embodiment, the method comprises a step of preparing a wire (for example, of the type used for fishing or of steel), for example, with the ends curled or knotted, and placing the wire, or occluding member, inside the flow section (typically circular) of the constriction element. Thus, the occluding member is separate from, and partly slidable in, the flow section of the constriction element.

In an embodiment, the method includes a step of regulating the drop in pressure caused by passing from a first to a second cross section of the relief duct. This allows regulating the time constant.

For example, this regulation can be performed in at least one of the following ways:
i) varying the position of a shutter positioned inside the relief duct to reduce its cross section;
ii) providing one or more regulatable throttles, placed in the relief duct, and regulating them.

According to another aspect of this disclosure, where the inflating device further comprises an auxiliary safety module (comprising a secondary valve according to one or more of the features described in this disclosure), the method comprises a step of interrupting air feed to the tyre by closing the secondary valve; in an example embodiment, the secondary valve is closed in response to a trend of the pressure in the safety line.

In this context, the inflating device may also include a diverter and a buffer tank (according to one or more of the features described in this disclosure), and the method may comprise a step of holding the diverter at a diverted position by means of a spring which is calibrated at a predetermined opening pressure.

Figure 1B:
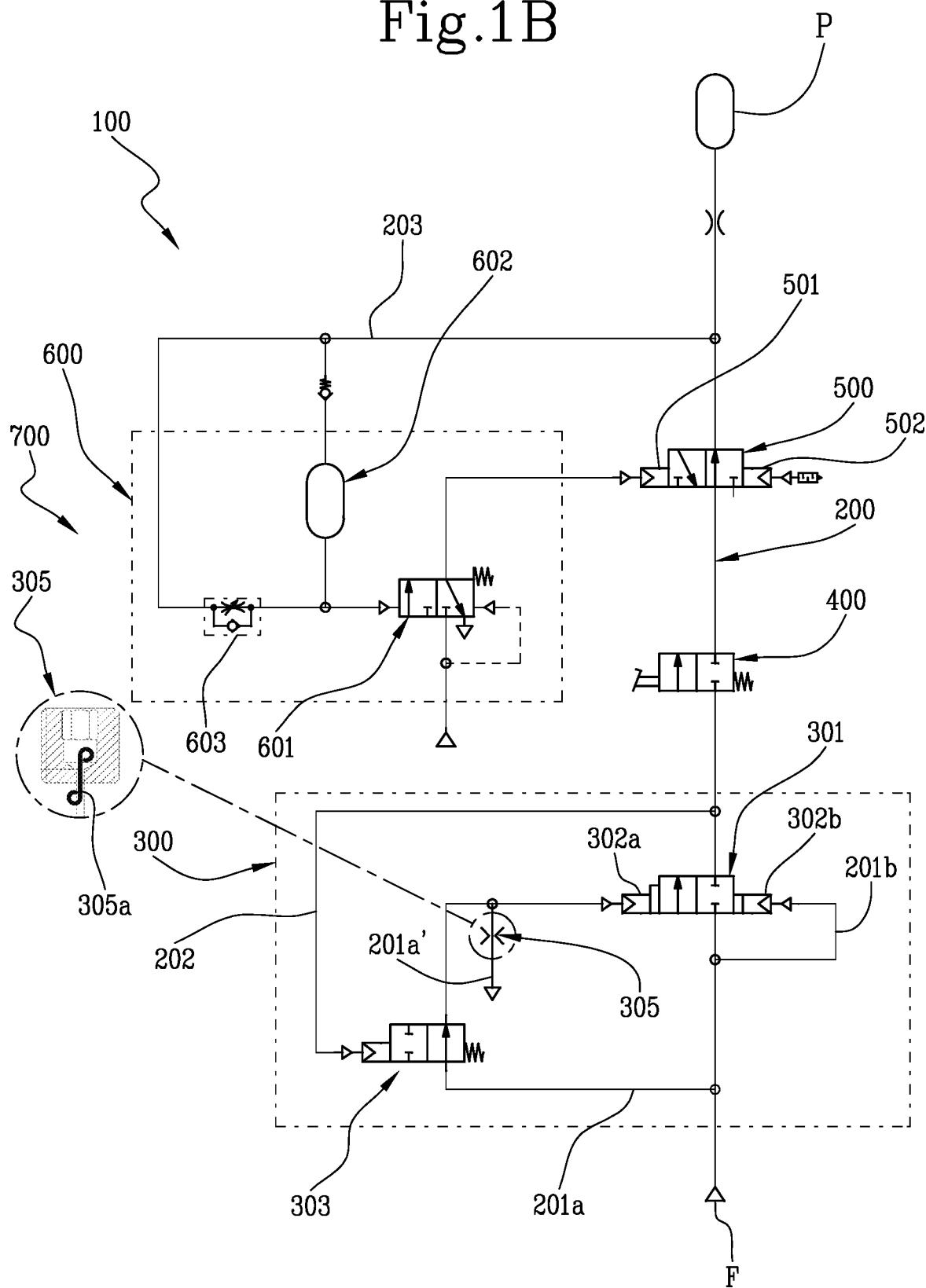

These and other features will become more apparent from the following detailed description of a preferred embodiment, illustrated by way of non-limiting example in the accompanying drawings, in which:

FIGS. 1A and 1B schematically represent two possible embodiments of the inflating device of this disclosure;

FIGS. 2A-2D represent an operating sequence of the inflating device of this disclosure according to an example embodiment.

With reference to the accompanying drawings, the numeral 100 denotes an inflating device for inflating a tyre P.

The inflating device 100 comprises an air feed line 200 configured to allow air to flow from an air feed source F to the tyre P, and an inflating module 300 which is operatively interposed between the feed source F and the tyre P.

The term "air feed source F" is used to mean a source of supplying a pressurized fluid (for example, air) such as, for example, a compressor or the like.

As shown in the accompanying drawings, the inflating module 300 comprises a primary valve 301, located on the air feed line 200 and movable between a closed position, where it prevents air from flowing through the feed line 200 into the tyre P, and an open position, where it allows the air to flow.

The inflating module 300 also comprises a first cylinder 302a which is operatively connected to the primary valve 301 and which is fed by a first branch 201a extending from the air feed line 200 at a point upstream of the primary valve 301. The first cylinder 302a is configured to cause the primary valve 301 to open to allow air to flow from the feed source F towards the tyre P.

As shown in the accompanying drawings, the inflating module 300 also comprises a second cylinder 302b which is operatively connected to the primary valve 301 and which is fed by a second branch 201b extending from the air feed line 200 at a point upstream of the primary valve 301. The second cylinder 302b is configured to cause the primary valve 301 to close to interrupt the flow of air towards the tyre P.

According to this disclosure, the first cylinder 302a and the second cylinder 302b are positioned opposite each other relative to the air feed line 200 and differ from each other in volume. More specifically, the first cylinder 302a is larger in volume than the second cylinder 302b.

Therefore, when the first cylinder 302a is fed by the first branch 201a, the primary valve 301 is pushed towards the open position; conversely, when (only) the second cylinder 302b is fed by the second branch 201b, the primary valve 301 is pushed towards the closed position. If both cylinders 302a, 302b are fed simultaneously by the respective branches 201a, 201b, the primary valve 301, because of the larger volume of the first cylinder is 302a, is moved to the open position, as described in more detail below.

In other words, the first and second branches 201a, 201b feed air to the first and second cylinders 302a, 302b, respectively, so as to cause the primary valve 301 to move and, consequently, to allow or interrupt air feed to the tyre P.

The inflating module 300 also comprises a shutoff valve 303, located on the first branch 201a and movable between a closed position, where it occludes the first branch 201a to prevent fluid communication between the first cylinder 302a and the feed line 200, and an open position, where it allows fluid communication.

The inflating module 300 also comprises a control leg 202 configured to allow air to be fed to the shutoff valve 303 from a point in the feed line 200 downstream of the primary valve 301. This supply of air switches the shutoff valve 303 from the open position to the closed position when a predetermined pressure value is exceeded.

Looking in more detail, the shutoff valve 303 is a calibratable valve—that is to say, a valve whose opening and closing can be regulated based on the value of the pressure of the air flowing into the valve. Since the air entering the shutoff valve 303 is the same that flows in the feed line 200 downstream of the primary valve 301 to inflate the tyre P, the pressure value at which the shutoff valve 303 is calibrated is the target pressure value for inflating the tyre P.

As shown in the accompanying drawings, the shutoff valve 303 comprises a spring, configured to allow the shutoff valve 303 to be regulated, and a flow chamber in which a stem of the shutoff valve 303 is slidably movable. In this situation, the shutoff valve 303 is in fluid communication with the control leg 202 through the flow chamber so that when the air is channeled from the feed line 200 into the control leg 202, it feeds the flow chamber. If the pressure of the air being channeled overcomes the resistance of the spring, meaning that it is greater than the predetermined pressure, the shutoff valve 303 is switched to the closed position, thus interrupting feed along the first branch 201a.

In other words, when the pressure of the air channeled in the control leg 202 exceeds the predetermined pressure value, the resistance of the spring is overcome and the shutoff valve 303 is closed, thus preventing air from being fed from the feed line 200 to the first cylinder 302a through the first branch 201a.

According to this disclosure, the inflating module 300 also comprises a relief duct 201a', extending from the first branch 201a between the shutoff valve 303 and the first cylinder 302a and configured to gradually release air from the first cylinder 302a to the outside environment when the shutoff valve 303 is closed.

Figure 2A:
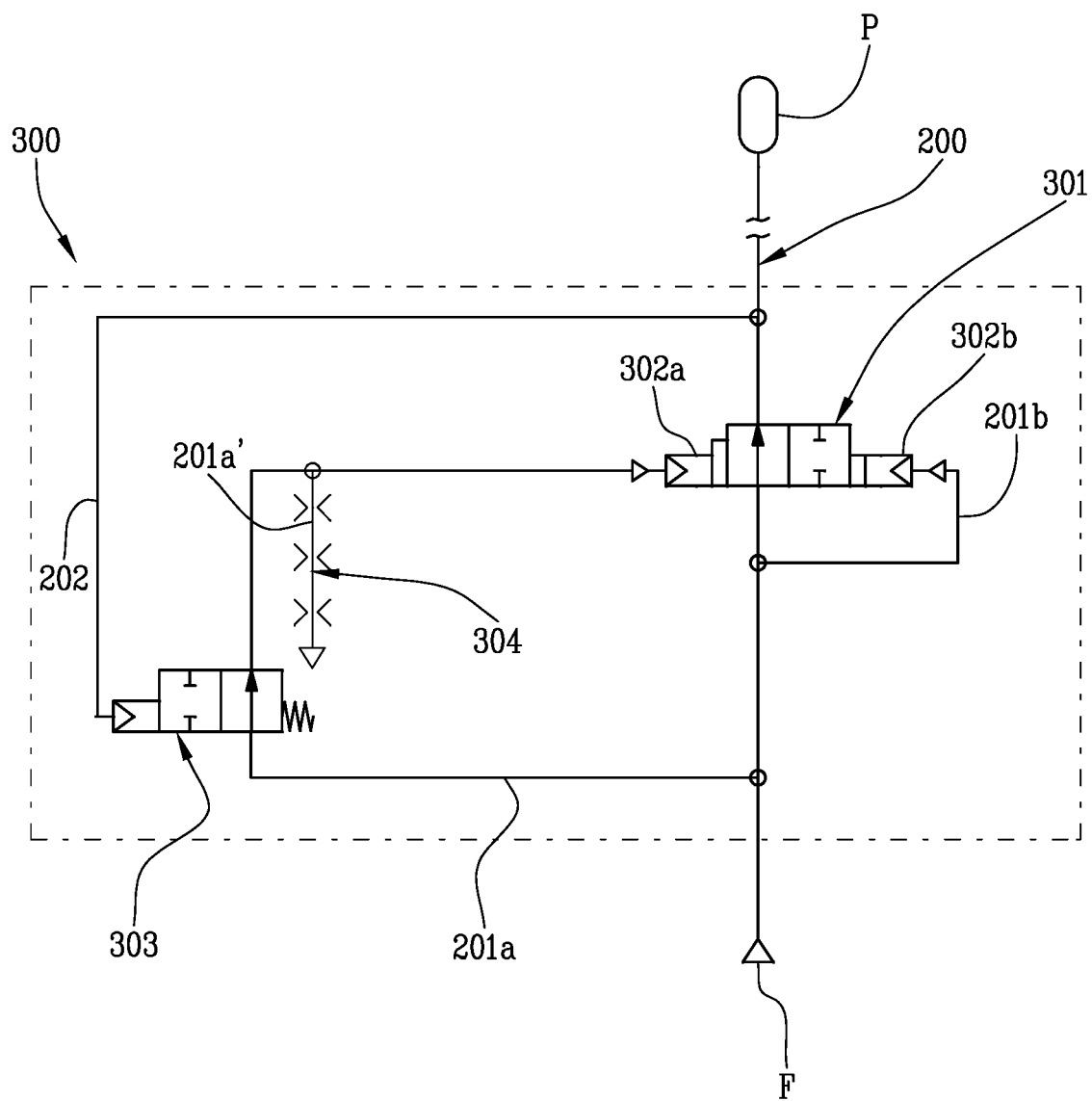
Figure 2B:
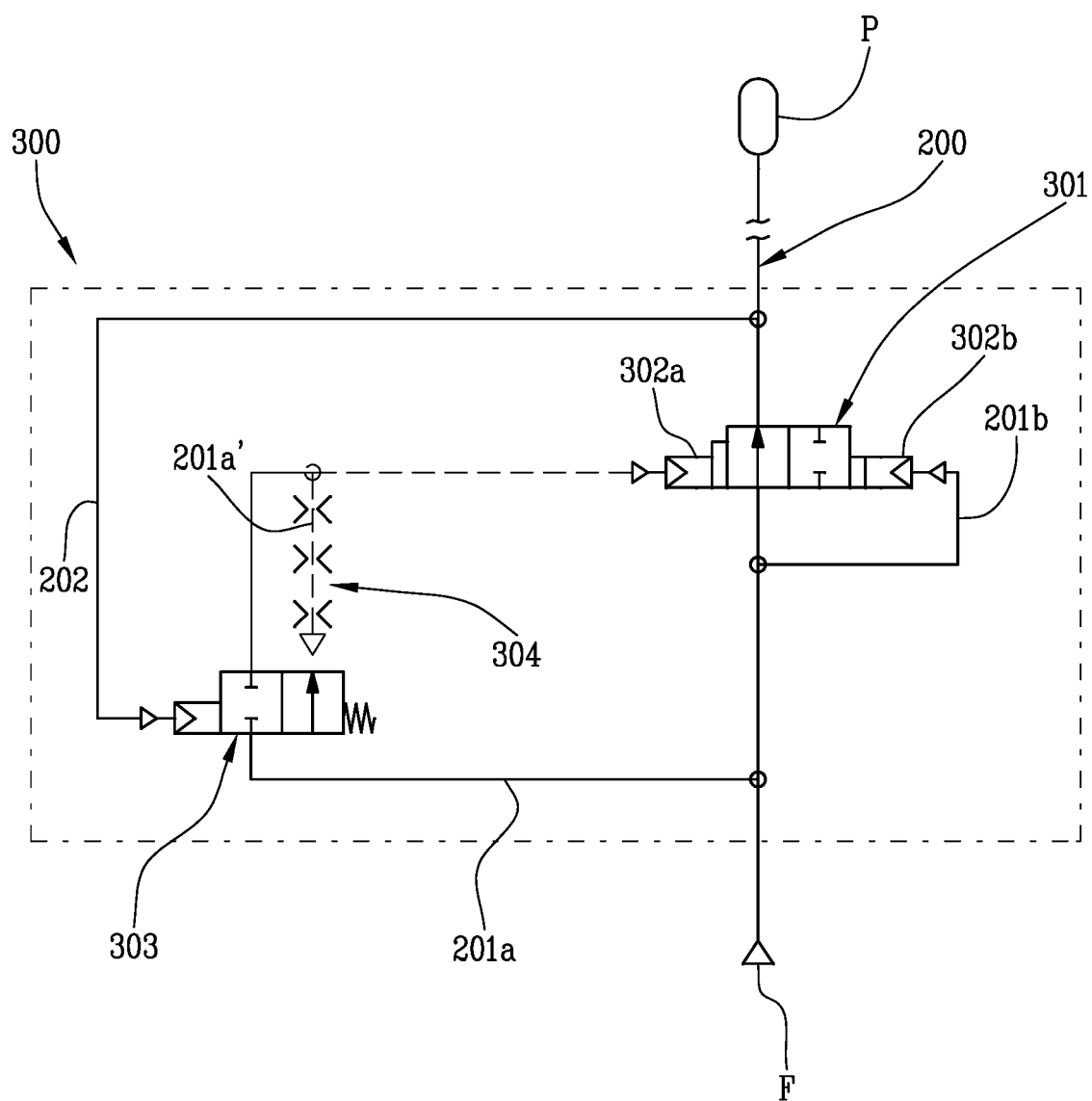

In use, the moment the shutoff valve 303 is switched from the open position to the closed position, the air supply fed by the first branch 201a to the first cylinder 302a is interrupted (FIG. 2B). In this situation, the pressurized air continues to be fed to the second cylinder 302b through the second branch 201b, while the air contained in the first cylinder 302a, which is no longer being fed, is gradually discharged through the relief duct 201a'.

Figure 2C:
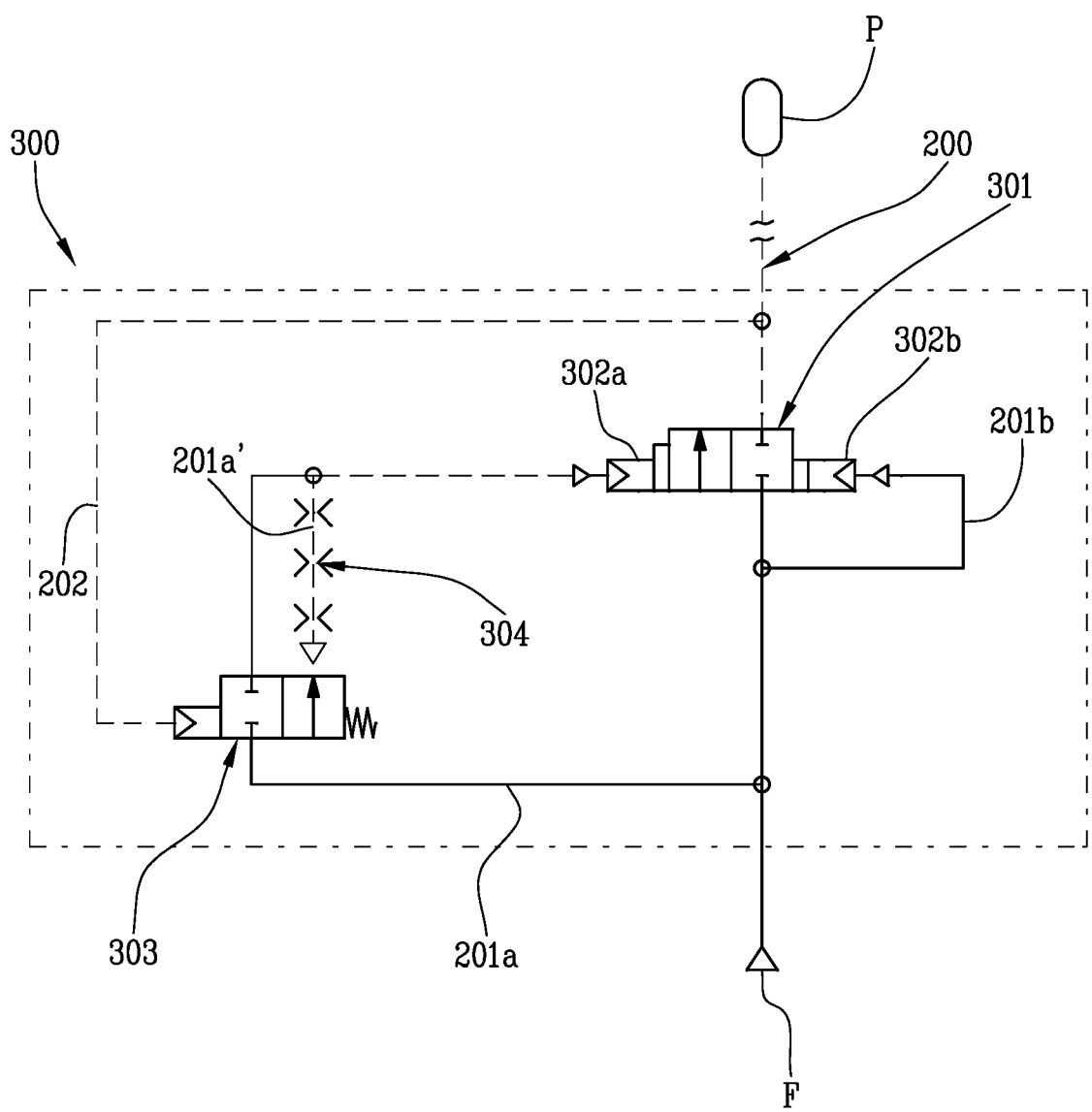

As shown in FIG. 2B, while the first cylinder 302a is being emptied, the air feed line 200 is still in fluid communication with the tyre P, which thus continues to be filled with air. This condition lasts until the pressure applied by the second cylinder 302b is greater than that applied by the first cylinder 302a. In this situation, the second cylinder 302b switches the primary valve 301 from the open position to the closed position, thus interrupting air feed to the tyre P through the air feed line 200 (FIG. 2C).

While the first cylinder 302a is being emptied, to increase the charging time (that is, the time in which the tyre P remains in fluid communication with the air feed line 200 following closure of the shutoff valve 303) or to reduce the predetermined pressure value at which the shutoff valve 303 closes, the time to empty the first cylinder 302a while the primary valve 301 is still at the open position should be increased by providing the relief duct 201a' with a plurality of throttles 304 or with an occluding member 305a (preferably inserted in a constriction element 305) which slow the egress of the air from the first cylinder 302a, to the outside environment.

In the embodiment shown in FIG. 1A, the inflating module 300 comprises a plurality of throttles 304 placed progressively in series along the relief duct 201a' and configured to create respective constrictions in the relief duct 201a' itself.

According to an aspect of this disclosure, the throttles 304 are placed in series in the relief duct 201a'.

According to a further aspect of this disclosure, the throttles 304 are placed along the outside of the relief duct 201a' and at least one of them is regulatable by means of a regulator.

According to a further aspect of this disclosure, each of the throttles 304 can be made by fitting a nut and set screw on the head of a throttle 304 of known type.

In an example embodiment, each throttle defines a hole 0.3 mm in diameter (in the section defining the constriction of the working air passage cross section). For example, for each of the throttles of the plurality of throttles, the area of the working air passage is in the range from 0.04 mm$^2$ to 0.2 mm$^2$. In an embodiment, the plurality of throttles (in series with each other) comprises at least four throttles (for example, four or five).

In another example embodiment (with reference to FIG. 1B, for example), the inflating module 300 comprises a constriction element 305 inserted in the relief duct 201a' to define a narrow-diameter cross section. The constriction element 305 is provided with an occluding member 305a adapted to occlude the air passage in the section so as to allow air to be discharged gradually to the outside environment. For example, the occluding member 305a is (operatively) inserted in the constriction element 305 to further constrict the working cross section of the air passage.

In this example embodiment, the cross section area of the working air passage ranges from 0.01 mm$^2$ to 0.035 mm$^2$, for example 0.02 mm$^2$ or 0.025 mm$^2$.

According to an aspect of this disclosure, as shown in the enlarged detail from FIG. 1B, the occluding member 305a is embodied in the form of a wire. More specifically, the wire is substantially in the shape of an S whose ends are curled to form two opposite loops.

Alternatively, the occluding member 305a may be embodied in the form of a movable shutter for varying the section of the relief duct 201a'.

Advantageously, the presence of the plurality of throttles 304 or the presence of the constriction element 305 contributes to prolonging the duration of the step of releasing the air from the first cylinder 302a and thus contributes to increasing the fraction of time in which the tyre P remains connected to the air feed line 200 when the shutoff valve 303 is at the closed position.

Advantageously, the plurality of throttles 304 and/or the occluding member 305a (in the constriction element 305) are less expensive and less cumbersome than the air tanks used in prior art devices.

In use, therefore, once the shutoff valve 303 (FIG. 2B) is closed, the air in the first cylinder 302a starts being released in gradual, controlled manner through the relief duct 201a, while the primary valve 301 is still open to allow inflating the tyre P. In this situation, the plurality of throttles 304 or the constriction element 305 has the effect of prolonging the time the air is released from the relief duct 201a, thereby preventing the primary valve 301 from closing and thus feed to the tyre P from being interrupted. The tyre P therefore continues to be fed until the pressure applied by the second cylinder 302b is greater than that applied by the first cylinder 302a. In this situation, the second cylinder 302b switches the primary valve 301 from the open position to the closed position, thus interrupting air feed to the tyre P through the air feed line 200 (FIG. 2C).

Figure 2D:
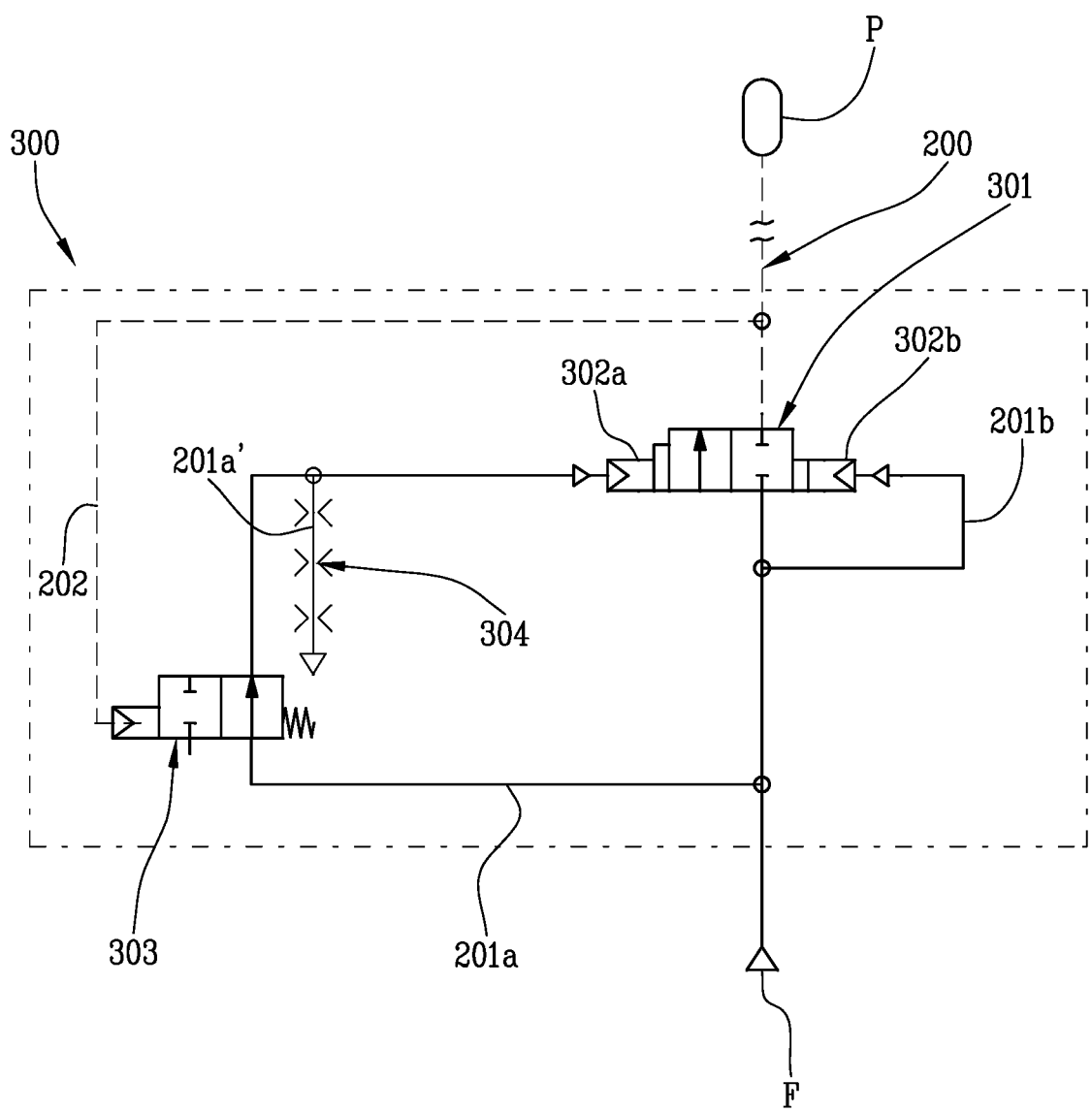

Consequently, as shown in FIG. 2D, downstream of the primary valve 301 and in the control leg 202, the pressure falls until reaching a value lower than the predetermined threshold value. In this situation, the air flow in the control leg 202 is no longer able to overcome the resistance of the spring and the shutoff valve 303 is thus switched from the closed to the open position again so as to allow air to flow in the first branch 201a to the first cylinder 302a.

Once air feed through the first branch 201a is resumed, the first cylinder 302a, since it is larger than the second cylinder 302b, is able to overcome the resistance of the second cylinder 302b and to switch the primary valve 301 from the closed to the open position so as to allow air to pass through towards the tyre P again (FIG. 2A).

Advantageously, the device 100 allows the tyre P to be inflated in a controlled manner, without having to increase the number of inflating cycles or the inflation time.

According to a further aspect of this disclosure, the inflating device 100 also comprises a distribution valve 400 located on the feed line 200 downstream of the inflating module 300 and operable to allow or prevent the air flow from the inflating module 300 to the tyre P.

Preferably, the distribution valve 400 can be operated by means of a pedal.

In other words, the distribution valve 400 is a valve which can be controlled, for example by an operator, to inflate the tyre P. Through the distribution valve 400, the operator can monitor the pressure in the tyre P increasing gradually until it reaches the desired value. In this situation, the operator can release the pedal to interrupt the supply of air by closing the distribution valve 400.

As shown in FIGS. 1A and 1B, the inflating device 100 may also comprise an auxiliary safety module 700.

The auxiliary safety module 700 comprises a secondary valve 500 located on the air feed line 200 (for example, downstream of the distribution valve 400 and, in any case, downstream of the inflating module 300). The secondary valve 500 is movable between a closed position, where it prevents air from flowing in the feed line 200 between the secondary valve 500 and the tyre P, and an open position, where it allows the air to flow. The auxiliary safety module 700 also comprises a first secondary cylinder 501 and a second secondary cylinder 502, both connected to the secondary valve 500. When the first secondary cylinder 501 prevails, the secondary valve 500 is at the open position; conversely, when the second secondary cylinder 502 prevails, the secondary valve 500 is at the open position.

The auxiliary safety module 700 also comprises a safety line 203 extending from a point on the feed line 200 between the secondary valve 500 and the tyre P towards the secondary valve 500. The safety line 203 allows the air to flow from a point on the feed line 200 between the tyre P and the secondary valve 500 towards the secondary valve 500 itself.

The auxiliary safety module 700 also comprises a timing module 600.

The timing module 600 comprises a diverter 601, located on the safety line 203 and configured to connect the secondary valve 500 to the feed line 200 or to the outside environment, respectively.

More specifically, the diverter 601 is configured to control the position of the secondary valve 500 as a function of its own position. Depending on the position of the diverter 601, a control cylinder of the secondary valve 500 is connected to the feed line 200 or to the outside environment. For example, the diverter 601 may be connected to the first secondary cylinder 501 and is movable between a feed position, where it allows the first secondary cylinder 601 to be connected to the feed source through the safety line 203, and a rest position, where it connects the first cylinder to the outside environment (to bring the first cylinder to ambient pressure).

The timing module 600 also comprises a buffer tank 602, located on the safety line 203 and configured to receive a predetermined quantity of air from the feed line 200 and to send the predetermined quantity of air to the secondary valve 500.

In other words, the safety line 203, before converging with the diverter 601, branches off into a first leg, including the buffer tank 602, and into a second leg, through which the air passes through a throttle or flow limiter 603 and reaches the diverter 601, which is held at a diverted position by a spring which is calibrated at a certain opening pressure. The presence of the buffer tank 602 allows damping the pneumatic response so as to protect the diverter 601 and the secondary valve 500. In an example embodiment, the flow limiter 603 could be regulatable. In an example embodiment, the safety line 203 is connected to the flow limiter 603 and to one end of the buffer tank 602. The flow limiter 603 is connected to a switching input of the diverter 601.

Advantageously, the device 100 of this disclosure allows regulating, specifically lowering, the predetermined pressure value without lengthening the inflating cycle time and/or without increasing the time needed to inflate the tyre P. In effect, thanks to the plurality of throttles 304 or thanks to the constriction element 305, the air takes more time to be discharged from the first cylinder 302a to the outside environment (while the primary valve 301 is still at the open position), thereby causing the pressure to fall more slowly. This allows keeping the fluid connection between the feed line 200 and the tyre P active through the primary valve 301 for a longer time.

Also an object of this disclosure is a method for controlling a process for inflating a tyre P, implemented by an inflating device 100 comprising an air feed line 200 configured to allow air to flow from an air feed source F to the tyre P, and an inflating module 300 which is operatively interposed between the feed source F and the tyre P.

The inflating module 300 comprises a primary valve 301, located on the air feed line 200 and movable between a closed position, where it prevents air from flowing through the feed line 200 into the tyre P, and an open position, where it allows the air to flow.

The inflating module 300 also comprises a first cylinder 302a and a second cylinder 302b, both operatively connected to the primary valve 301. The first cylinder 302a is configured to cause the primary valve 301 to open while the second cylinder 302b is configured to cause the primary valve 301 to close.

The first and the second cylinder 302a and 302b are fed, respectively, by a first branch 201a, extending from the feed line 200 at a point upstream of the primary valve 301, and by a second branch 201b, also extending from the feed line 200 at a point upstream of the primary valve 301.

The inflating module 300 also comprises a shutoff valve 303, located on the first branch 201a and movable between a closed position, where it occludes the first branch 201a to prevent fluid communication between the first cylinder 302a and the feed line 200, and an open position, where it allows fluid communication.

The inflating module 300 also comprises a control leg 202 configured to allow air to be fed to the shutoff valve 303 from a point in the feed line 200 downstream of the primary valve 301. The supply of air switches the shutoff valve 303 from the open position to the closed position when a predetermined pressure value is exceeded. The shutoff valve 303 is a regulatable valve and comprises a flow chamber, connected to the control leg 202, and a regulating spring, configured to regulate the closing of the valve itself.

The inflating module 300 also comprises a relief duct 201a', extending from the first branch 201a between the shutoff valve 303 and the first cylinder 302a and configured to gradually release air from the first cylinder 302a to the outside environment when the shutoff valve 303 is closed. More specifically, to gradually release air from the first cylinder 302a, the inflating module 300 comprises a plurality of throttles 304, placed progressively in series along the relief duct 201a' and configured to create respective constrictions in the relief duct 201a', or a constriction element 305, inserted in the relief duct 201a' to define a reduced cross section (or a narrow-diameter cross section, considering the cross section to be circular in an example embodiment). The constriction element 305 is provided with an occluding member 305a, for example, a wire or a shutter, adapted to occlude the air passage in the section.

Preferably, the method for controlling an inflating process is implemented by an inflating device 100 as described in the foregoing.

The method for controlling an inflating process comprises a step of connecting the feed line 200 to the air source F—for example, to a compressor—and a step of feeding air to the first cylinder 302a through the first branch 201a and to the second cylinder 302b through the second branch 201b so as to move the primary valve 301 to the open position.

Since both cylinders 302a, 302b are fed simultaneously, the first cylinder 302a, which is larger in cross section than the second cylinder 302b, applies a greater force on the primary valve 301 and keeps it at the open position.

The method comprises a step of feeding air to the shutoff valve 303 through the control leg 202.

More specifically, as shown in FIGS. 2A and 2B, when the primary valve 301 is at the open position and the pressurized air flows from the feed source F to the tyre P, some of the air feeds the control leg 202 and reaches the shutoff valve 303 through the flow chamber. In this situation, the method comprises a step of measuring the pressure of the air entering the tyre P, that is to say, the pressure of the air flowing in the feed line 200, and a step of comparing this value with the predetermined value. Next, the method comprises a step of driving the shutoff valve 303 from the open to the closed position based on the measurement performed.

If the value measured is greater than the predetermined value, the pressure of the air flowing in the control leg 202 is able to overcome the resistance of the spring of the shutoff valve 303, thus closing the valve to prevent air from flowing into the first cylinder 302a.

In this situation, the method also comprises a step of continuing to feed air to the first cylinder 302b to switch the primary valve 301 from the open position to the closed position so as to interrupt air feed to the tyre P.

More specifically, as shown in FIGS. 2B and 2C, the moment the shutoff valve 303 closes, the air present in the first cylinder 302a starts flowing out into the outside environment while the air feed line 200 is still in fluid communication with the tyre P through the primary valve 301. In this situation, the method comprises a step of allowing air in the first branch 201a, to flow from the first cylinder 302a to the relief duct 201a', where the plurality of throttles 304 or the constriction element 305 allow the air to be released into the outside environment gradually.

The plurality of throttles 304 and/or the occluding member 305a (in the constriction element 305) act as resistance or barrier to the air flowing out of the relief duct 201a' so as to slow its egress. By slowing the egress of the air from the first cylinder 302a, it is possible to keep the primary valve 301 open for longer so as to increase the time in which the air is supplied to the tyre P. In effect, in this situation, the second cylinder 302b, fed continuously by the second branch 201b, is unable to overcome the pressure applied by the first cylinder 302a, allowing the primary valve 301 to remain at the open position for longer and thus reducing the number of inflating cycles needed to completely inflate the tyre P.

As shown in FIG. 2C, the primary valve 301 remains at the open position until the second cylinder 302b overcomes the resistance of the first cylinder 302a. In this situation, the primary valve 301 is closed and feed to the tyre P is interrupted.

Downstream of the primary valve 301, in the feed line 200 and in the control leg 202, the pressure gradually decreases until reaching a value which is smaller than the predetermined value. In this situation, the air flowing in the control leg 202 is no longer able to overcome the resistance of the spring of the shutoff valve 303, which thus returns to the open position. As shown in FIG. 2D, when the shutoff valve 303 is at the open position, the air from the feed source F is able to flow into the first branch 201a which can thus start feeding the first cylinder 302a again, and the latter, being larger in volume than the second cylinder 302b, overcomes the resistance applied by the second cylinder 302b and switches the primary valve 301 to the open position so as to allow air to be fed to the tyre P again for another inflating cycle.

This invention achieves the preset aims and overcomes the disadvantages of the prior art.

More specifically, the inflating device 100 is reliable and efficient.

In addition, the inflating device 100 is less expensive and less cumbersome than prior art devices.

The plurality of throttles 304 or the constriction element 305 allow lowering the predetermined pressure value for inflating the tyre P without increasing the time necessary for inflation.

The method of this invention, for controlling a tyre inflating process, is reliable and dependable.

The invention claimed is:

1. An inflating device for inflating a tyre, comprising:
   an air feed line, configured to allow air to flow from an air feed source to the tyre in an inflating direction;
   an inflating module, interposed between the air feed source and the tyre and including:
   a primary valve, located on the air feed line and movable between a closed position, where it prevents air from flowing into the tyre, and an open position, where it allows the air to flow;
   a first cylinder operatively connected to the primary valve and configured to cause the primary valve to open;
   a first branch having a first end positioned at a point of the air feed line located upstream of the primary valve in the inflating direction, and a second end connected to the first cylinder so that the first branch extends between the air feed line and the first cylinder;
   a second cylinder which is operatively connected to the primary valve and which is fed by a second branch extending from the air feed line at a point upstream of the primary valve, the second cylinder being configured to cause the primary valve to close;
   a shutoff valve, located on the first branch and movable between a closed position, where it occludes the first branch to prevent fluid communication between the feed line and the first cylinder, and an open position, where it allows fluid communication, wherein the shutoff valve is configured to divide the first branch into a first stretch extending between the air feed line and the shutoff valve, and a second stretch extending between the shutoff valve and the first cylinder;
   a control leg, configured to allow feeding air to the shutoff valve from a point on the feed line downstream of the primary valve in the inflating direction, the feeding of air causing the shutoff valve to switch from the open position to the closed position in response to a predetermined pressure value being exceeded;
   a relief duct configured to gradually release air from the first cylinder to an outside environment when the shutoff valve is closed, wherein the relief duct extends for a length from the second stretch of the first branch at a branching point distanced from the first cylinder, and includes a regulator within said length, wherein the regulator varies in a controlled manner a free flow cross section inside the relief duct;
   wherein the inflating module includes a constricting arrangement which reduces a working air flow cross section of the relief duct.

2. The device according to claim 1, wherein the constricting arrangement includes a plurality of throttles placed in series along the relief duct and configured to create respective constrictions in the relief duct.

3. The device according to claim 1, wherein the constricting arrangement includes a constriction element placed in the relief duct and an occluding member inserted in the constriction element to further occlude the working air flow cross section of the relief duct.

4. The device according to claim 3, wherein the occluding member is embodied in the form of a wire.

5. The device according to claim 3, wherein the occluding member defines a shutter which is movable to allow varying the working air flow cross section.

6. The device according to claim 2, wherein at least one of the throttles of the plurality of throttles is regulatable through a regulator.

7. The device according to claim 2, wherein the plurality of throttles define a corresponding plurality of constrictions in the relief duct aligned along the relief duct and spaced from each other.

8. The device according to claim 1, wherein the first branch, extending from the air feed line, has no air buffer tanks or vessels configured to expand a volume of air contained in the first branch and in the first cylinder.

9. The device according to claim 1, comprising:
a secondary valve, located on the air feed line, downstream of the inflating module and movable between a closed position, where it prevents air from flowing in the feed line between the inflating module and the tyre, and an open position, where it allows the air to flow;
a safety line extending from a point on the feed line downstream of the secondary valve.

10. The device according to claim 9, comprising a timing module including:
a diverter, located on the safety line and configured to connect the secondary valve to the feed line or to the outside environment, respectively;
a buffer tank, located on the safety line and configured to receive a quantity of air from the feed line and to drive the diverter.

11. The device according to claim 1, comprising a distribution valve located on the feed line downstream of the inflating module and operable to allow or prevent the air flow from the inflating module to the tyre.

12. A tyre changing apparatus for mounting and demounting a tyre to and from a vehicle wheel rim, the apparatus comprising an inflating device for inflating a tyre, the inflating device comprising:
an air feed line, configured to allow air to flow from an air feed source to the tyre in an inflating direction;
an inflating module, interposed between the air feed source and the tyre and including:
a primary valve, located on the air feed line and movable between a closed position, where it prevents air from flowing into the tyre, and an open position, where it allows the air to flow;
a first cylinder operatively connected to the primary valve and configured to cause the primary valve to open;
a first branch having a first end positioned at a point of the air feed line located upstream of the primary valve in the inflating direction, and a second end connected to the first cylinder so that the first branch extends between the air feed line and the first cylinder;
a second cylinder which is operatively connected to the primary valve and which is fed by a second branch extending from the air feed line at a point upstream of the primary valve, the second cylinder being configured to cause the primary valve to close;
a shutoff valve, located on the first branch and movable between a closed position, where it occludes the first branch to prevent fluid communication between the feed line and the first cylinder, and an open position, where it allows fluid communication, wherein the shutoff valve is configured to divide the first branch into a first stretch extending between the air feed line and the shutoff valve, and a second stretch extending between the shutoff valve and the first cylinder;
a control leg, configured to allow feeding air to the shutoff valve from a point on the feed line downstream of the primary valve in the inflating direction, the feeding of air causing the shutoff valve to switch from the open position to the closed position in response to a predetermined pressure value being exceeded;
a relief duct configured to gradually release air from the first cylinder to an outside environment when the shutoff valve is closed, wherein the relief duct, extends for a length from the second stretch of the first branch at a branching point distanced from the first cylinder, and
wherein the inflating module includes a constricting arrangement which reduces a working air flow cross section of the relief duct, the constricting arrangement including a constriction element, placed within the length of the relief duct for reducing a working air flow cross section of the relief duct, and a wire, inserted in the constriction element to further occlude the working air flow cross section of the relief duct at the constriction element.

13. A method for controlling a process for inflating a tyre, wherein the inflating process is implemented by an inflating device comprising:
an air feed line, configured to allow air to flow from an air feed source to the tyre;
an inflating module, interposed between the air feed source and the tyre and including:
a primary valve, located on the air feed line and movable between a closed position, where it prevents the air from flowing through the feed line into the tyre, and an open position, where it allows the air to flow;
a first cylinder connected to the primary valve in order to open it and supplied with air by a first branch of the feed line;
a second cylinder connected to the primary valve in order to close it and supplied with air by a second branch of the air feed line;
a shutoff valve, located on the first branch and movable between a closed position, where it occludes the first branch to prevent fluid communication between the first cylinder and the feed line, and an open position, where it allows fluid communication;
a control leg, configured to feed air to the shutoff valve from a point on the feed line downstream of the primary valve so as to switch the shutoff valve from the open position to the closed position in response to a predetermined pressure value being exceeded;
a relief duct, extending from the first branch between the shutoff valve and the first cylinder to gradually release air from the first cylinder to an outside environment when the shutoff valve is closed;
connecting the feed line to the air source;
feeding air to the first cylinder through the first branch and to the second cylinder through the second branch so as to move the primary valve to the open position;
feeding air to the shutoff valve through the control leg;
measuring the pressure value of the air entering the tyre;
comparing the measured pressure value with a predetermined pressure value;
in response to the comparison, driving the shutoff valve between the open position and the closed position so that, if the pressure value is greater than the predetermined pressure value, the shutoff valve is switched from the open position to the closed position;

continuing to feed air to the first cylinder to switch the primary valve from the open position to the closed position so as to interrupt air feed to the tyre;

discharging air from the first cylinder to an outside environment through an air passage in the relief duct, wherein, during the step of discharging, a working air flow cross section of the relief duct is reduced.

14. The method according to claim 13, wherein the air passes through a plurality of throttles placed in series along the relief duct.

15. The method according to claim 13, wherein air passes through a constriction element placed in the relief duct, where an occluding member is inserted in the constriction element to further occlude the working air flow cross section of the relief duct.

16. The method according to claim 15, comprising the following steps:
preparing a wire;
placing the wire inside the constriction element of the relief duct.

17. The method according to claim 13, comprising a step of regulating the working air flow cross section of the relief duct.

18. The method according to claim 13, wherein the inflating device further comprises:
a secondary valve, located on the air feed line, downstream of the inflating module and movable between a closed position, where it prevents air from flowing in the feed line between the secondary valve and the tyre, and an open position, where it allows the air to flow;
a safety line extending from a point on the feed line between the secondary valve and the tyre towards the secondary valve,
the method comprising a step of interrupting air feed to the tyre by closing the secondary valve in response to a pressure trend in the safety line.

19. The method according to claim 18, wherein the inflating device further comprises a timing module including:
a diverter, located on the safety line and configured to connect the secondary valve to the feed line or to the outside environment;
a buffer tank, located on the safety line and configured to receive a quantity of air from the feed line and to drive the diverter
the method comprising a step of holding the diverter at a diverted position by means of a spring which is set at a predetermined opening pressure.

20. An inflating device for inflating a tyre, comprising:
an air feed line, configured to allow air to flow from an air feed source to the tyre in an inflating direction;
an inflating module, interposed between the air feed source and the tyre and including:
a primary valve, located on the air feed line and movable between a closed position, where it prevents air from flowing into the tyre, and an open position, where it allows the air to flow;
a first cylinder which is operatively connected to the primary valve and which is fed by a first branch extending from the air feed line at a point upstream of the primary valve in the inflating direction, the first cylinder being configured to cause the primary valve to open;
a second cylinder which is operatively connected to the primary valve and which is fed by a second branch extending from the air feed line at a point upstream of the primary valve, the second cylinder being configured to cause the primary valve to close;
a shutoff valve, located on the first branch and movable between a closed position, where it occludes the first branch to prevent fluid communication between the feed line and the first cylinder, and an open position, where it allows fluid communication;
a control leg, configured to allow feeding air to the shutoff valve from a point on the feed line downstream of the primary valve in the inflating direction, the feeding of air causing the shutoff valve to switch from the open position to the closed position in response to a predetermined pressure value being exceeded;
a relief duct, extending from the first branch between the shutoff valve and the first cylinder and configured to gradually release air from the first cylinder to an outside environment when the shutoff valve is closed,
wherein the inflating module includes a constricting arrangement which reduces a working air flow cross section of the relief duct, the inflating device further comprising:
a secondary valve, located on the air feed line, downstream of the inflating module and movable between a closed position, where it prevents air from flowing in the feed line between the inflating module and the tyre, and an open position, where it allows the air to flow;
a safety line extending from a point on the feed line downstream of the secondary valve;
a timing module including a diverter, located on the safety line and configured to connect the secondary valve to the feed line or to the outside environment, respectively, and a buffer tank, located on the safety line and configured to receive a quantity of air from the feed line and to drive the diverter.

\* \* \* \* \*